(12) United States Patent
Sato et al.

(10) Patent No.: US 6,718,482 B2
(45) Date of Patent: Apr. 6, 2004

(54) FAULT MONITORING SYSTEM

(75) Inventors: Masahide Sato, Kawasaki (JP); Toshikazu Umezu, Toki (JP); Shinji Kimura, Sagamihara (JP); Toshiaki Arai, Machida (JP)

(73) Assignee: Hitachi, Ltd., Tokyo (JP)

( * ) Notice: Subject to any disclaimer, the term of this patent is extended or adjusted under 35 U.S.C. 154(b) by 484 days.

(21) Appl. No.: 09/764,406

(22) Filed: Jan. 19, 2001

(65) Prior Publication Data

US 2001/0025371 A1 Sep. 27, 2001

Related U.S. Application Data

(63) Continuation-in-part of application No. 09/151,270, filed on Sep. 11, 1998.

(30) Foreign Application Priority Data

Sep. 12, 1997 (JP) ............................................. 9-248178
Sep. 7, 2000 (JP) ....................................... 2000-276606

(51) Int. Cl.[7] ................................................. G06F 11/00
(52) U.S. Cl. .............................. 714/4; 714/26; 714/48; 714/57
(58) Field of Search ................................ 714/47, 48, 4, 714/57, 30, 31, 26

(56) References Cited

U.S. PATENT DOCUMENTS

| 5,721,922 | A | | 2/1998 | Dingwall |
| 5,787,409 | A | * | 7/1998 | Seiffert et al. ................. 706/45 |
| 5,805,790 | A | * | 9/1998 | Nota et al. ..................... 714/10 |
| 6,477,667 | B1 | * | 11/2002 | Levi et al. ..................... 714/57 |
| 6,615,376 | B1 | * | 9/2003 | Olin et al. ..................... 714/57 |
| 2002/0120884 | A1 | * | 8/2002 | Nakamikawa et al. ......... 714/31 |
| 2002/0129305 | A1 | * | 9/2002 | Ahrens et al. ................. 714/57 |
| 2002/0188895 | A1 | * | 12/2002 | Quach et al. .................. 714/48 |
| 2003/0097422 | A1 | * | 5/2003 | Richards et al. ............. 709/217 |

FOREIGN PATENT DOCUMENTS

| JP | 5-250284 | 9/1993 |
| JP | 5-257914 | 10/1993 |
| JP | 9-50386 | 2/1997 |

OTHER PUBLICATIONS

Kimura, Shinji. High–reliability and High–availability DARMA Nanokernel. Hitachi–SDL. pp. 1–10.*
"Modern Operating Systems", Prentice Hall, 1992, Andrew S. Tanenbaum, pp. 21–22 & 637–641.

* cited by examiner

Primary Examiner—Nadeem Iqbal
Assistant Examiner—Yolanda L Wilson
(74) Attorney, Agent, or Firm—Mattingly, Stanger & Malur, P.C.

(57) ABSTRACT

In a fault monitoring system which monitors software faults in a computer to be monitored, transmits a fault notification to a different computer connected to the computer through a network when a fault occurs, and controls the monitored computer in accordance with a request command from the different computer connected through the network, a first software environment to be monitored and a second software environment for monitoring the first software environment are constructed on the monitored computer.

12 Claims, 16 Drawing Sheets

FAULT MONITORING SYSTEM

CROSS-REFERENCE TO RELATED APPLICATIONS

This is a continuation-in-part of application Ser. No. 09/151,270, filed Sep. 11, 1998, the contents of which are incorporated herein by reference.

BACKGROUND OF THE INVENTION

The present invention relates to a computer system and a method of monitoring faults occurring in the computer system and more particularly, to a fault monitoring system for monitoring a fault when the fault takes place in software.

Conventionally, as a technique for monitoring faults in a computer such as a personal computer, a technique disclosed in, for example, JP-A-9-50386, JP-A-5-250284 or JP-A-5-257914 has been known.

According to the technique as above, the computer representing an object to be monitored is connected with an optional board, dedicated to fault monitoring, which carries a processor independent of another processor possessed by the main body of the computer. The optional board monitors a state of hardware in the computer main body to detect faults in the hardware and besides, communicates periodically with a monitor program operating on the computer to detect faults in software.

In the event that the optional board detects a fault, the generation of the fault is notified to a different computer connected through a network by using a communication mechanism owned by the optional board or the computer. The computer connected through the network can perform power control in the monitored computer (on/off of the power supply) and can be rebooted.

For remote control of computers, an object computer must be controlled through the network. Typically, for the sake of controlling the object computer through the network, communication with software operating on the object computer is effected to transmit a control request inputted through the network to the software on the object computer. The software on the computer to be controlled receives the transmitted control request to execute a process complying with the request.

The remote control of the computer as above, however, presupposes that the software operating on the computer representing the control object operates normally. Accordingly, when a fault occurs in the software operating on the computer representing the control object, there is a possibility that the remote control cannot fulfill itself. Especially, when an operating system (OS) becomes faulty, communication per se cannot sometimes be implemented through the network. Such a disadvantage becomes fatally problematic in executing fault monitoring for a computer at a remote location from another computer connected through the network.

In the technique disclosed in the JP-A-9-50386, an optional board for fault monitoring is used to make periodical communication between software operating on a computer representing an object to be monitored and the optional board in order that a fault in the software can be detected by the presence or absence of a response in the communication. When a fault is detected, the fault is notified to another computer by means of the communication function of the optional board. According to this technique, even in the event that a fault takes place in the monitored computer, fault notification and computer control from a remote location can be implemented.

The technique disclosed in the JP-A-9-50386, however, faces problems as below.

(1) In the event of the software fault occurrence, software information such as information concerning a state of the software operating on the computer main body or information managed and held by the software cannot be collected.

(2) Since the optional board has the communication function operative independently of the computer main body, only a communication program adopting a network protocol supported by the optional board can be utilized and the function for implement is limited.

(3) Communication is made between the optional board and the monitored computer during occurrence of a fault, thus requiring a program operating on the optional board, but an amount of resources such as memories is smaller on the optional board than on the computer main body and the function for implement is limited.

The problems enumerated in (2) and (3) above can be solved by implementing a plurality of network protocols in the optional board or adding resources to the optional board per se. Even in that case, however, there arises a problem that costs of development of the optional board and costs of production increase.

SUMMARY OF THE INVENTION

An object of the present invention is to provide a fault monitoring system which, even when a fault occurs in a computer, can control the computer by a request command from a different computer connected to the computer through a network.

Another object of the invention is to provide a fault monitoring system which can transmit fault information to the different computer connected through the network even when a software fault takes place in the computer representing an object to be monitored.

Still another object of the invention is to relieve the limited function due to a shortage of computer resources in the monitored computer.

To accomplish the above objects, according to the present invention, a computer representing an object to be monitored (a monitored computer) is connected to a computer for monitoring the monitored computer (a monitoring computer) through a network.

In a preferred embodiment of the invention, the monitored computer includes a multi-OS controller for operating a plurality of OS's on the single computer, and a first software environment which is constructed by a first OS and serves as an object to be monitored and a second software environment which is constructed by a second OS and is independent of the first software environment are formed on the monitored computer.

On the second software environment, communicating means for making communication with the different computer through the network and a fault monitor agent for monitoring the occurrence of software faults in the first software environment operate. When detecting the occurrence of a fault in the first software environment, the fault monitor agent notifies the monitoring computer of the fault occurrence. Receiving the notification, the monitoring computer communicates with the fault monitor agent to command that the monitored computer should be controlled. Responsive to the command from the monitoring computer, the fault monitor agent controls the monitored computer.

In an embodiment of the invention, the fault notification and the control operation of the monitored computer are commanded by electronic mail (E-mail).

The fault monitor agent carries out detection of a fault in the first software environment by monitoring an alive message delivered out of another fault monitor agent operating on the first software environment.

DESCRIPTION OF THE EMBODIMENTS

Figure 1:
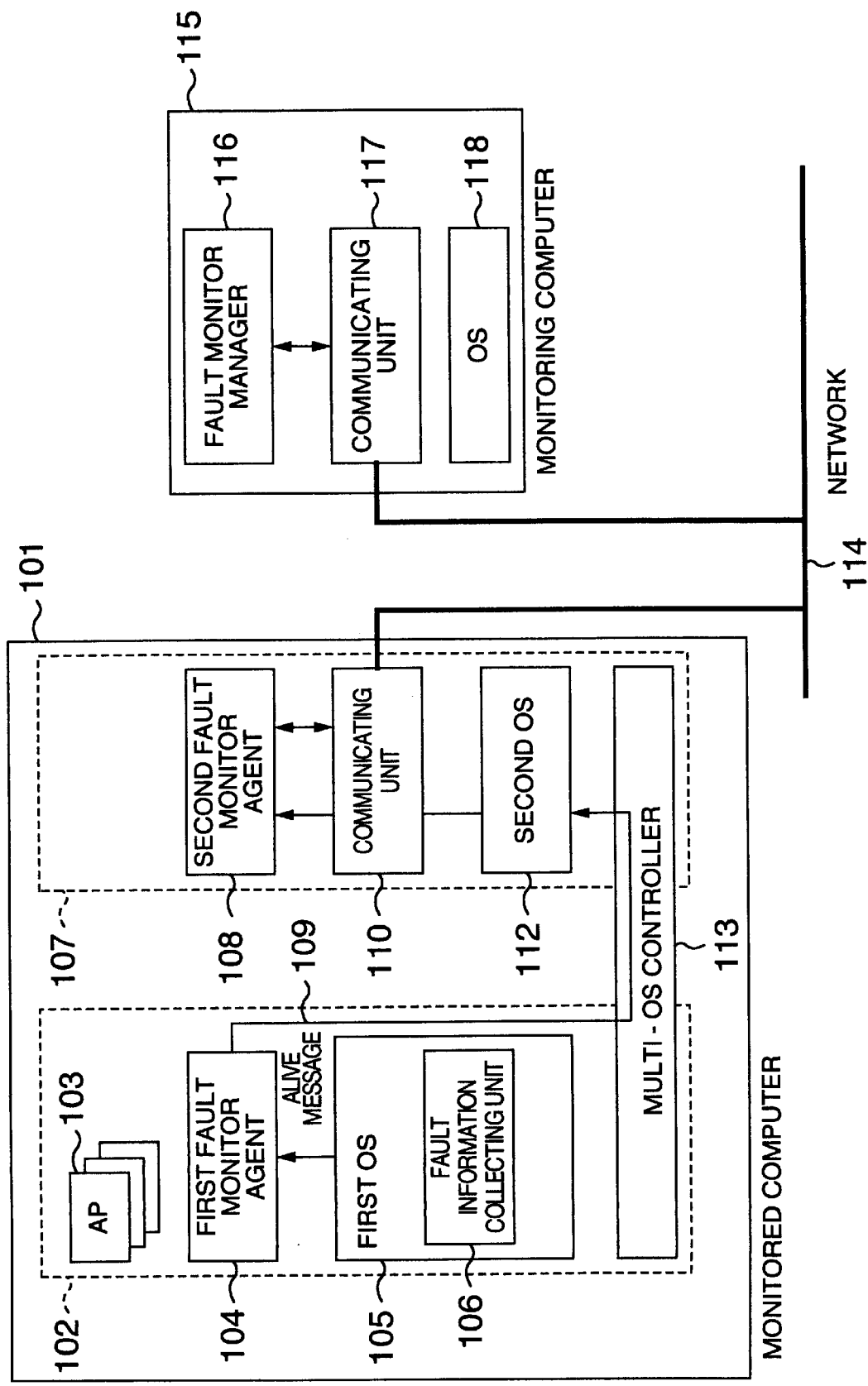
FIG. 1 is a block diagram showing the construction of a computer system according to a first embodiment of the invention.

Referring now first to FIG. 1, there is illustrated, in block form, a computer system constructed according to an embodiment of the invention.

In the figure, computers 101 and 115 are connected to each other through a network 114. The computer 101 is a computer serving as an object to be monitored (monitored computer) and the computer 115 is a monitoring computer for monitoring faults taking place in the computer 101.

The monitored computer 101 has a multi-OS controller 113 for operating a plurality of OS's on that computer. A first OS 105 and a second OS 112 different from the first OS operate on the monitored computer 101 and the multi-OS controller 113 aids in constructing a software environment for one OS and a software environment for the other OS which is independent of that for the one OS. Indicated by dotted line 102 is the software environment for the first OS and indicated by dotted line 107 is the software environment for the second OS.

As a technique for realizing environments for operation of a plurality of OS's on a single computer, a technique disclosed in, for example, JP-A-11-149385 has been known. In the present embodiment, the technique disclosed in the JP-A-11-149385 is applied to construct the software environment 102 for the first OS and the software environment 107 for the second OS on the monitored computer 101.

In the first OS software environment 102, the first OS 105, a first fault monitor agent 104 for transmitting an alive message 109 indicating that no fault occurs in the first OS 105 to the second OS 112 through the multi-OS controller 113 and an application program (AP) 103 operate. The first OS 105 has fault information collecting means 106 for collecting fault information concerning faults in the first OS 105 when a software fault takes place in the first OS 105 per se. The fault information collecting means 106 is used when the first OS 105 detects a fault of its own so as to collect fault information such as register information and memory information during the occurrence of the fault. The fault information collecting means 106 has the function to restart the monitored computer 101 after having collected the fault information.

In the second OS software environment 107, there operate the second OS 112, a second fault monitor agent 108 for detecting faults in the first OS 105 and commanding computer control when a fault occurs and communicating means 110 for causing the second fault monitor agent 108 to communicate with the computer connected.

In the monitoring computer 115, an OS 118 and a fault monitor manager 116 operate. The computer 115 further includes communicating means 117 necessary for the computer 115 to communicate with the computer connected through the network 114.

The fault monitor manger 116 communicates with the second fault monitor manger 108 of the monitored computer 101 to receive a fault notification from the monitored computer 101. Also, the fault monitor manager 116 transmits to the second fault monitor agent 108 a command to control the monitored computer 101. When receiving the fault notification from the second fault monitor agent 108, the fault monitor manager 116 informs an operator of the monitoring computer 115 that the fault notification is received.

Figure 2:
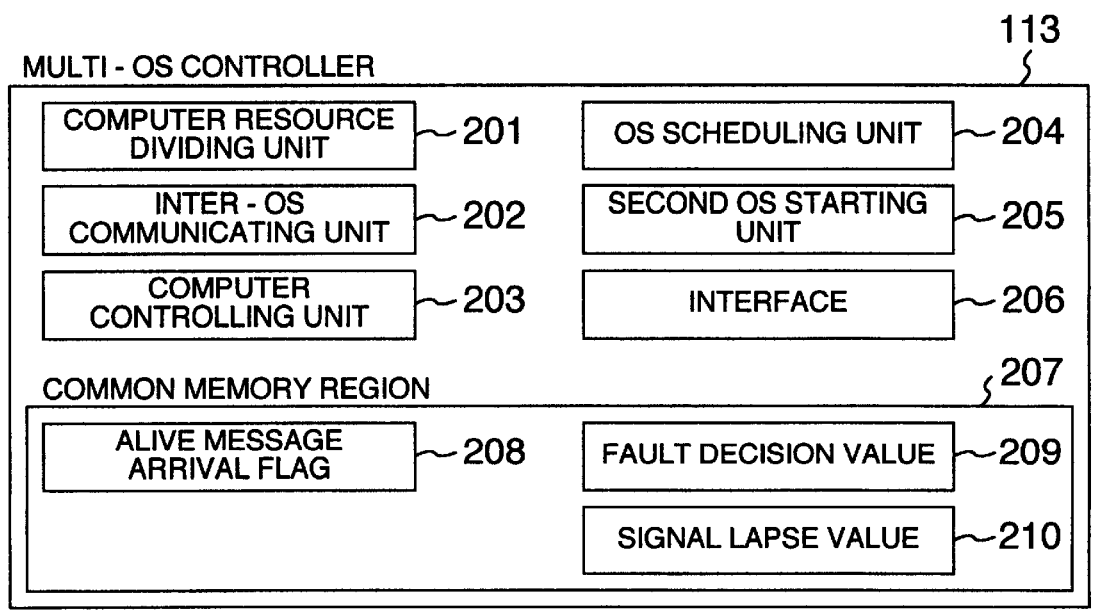
FIG. 2 is a diagram showing the construction of a multi-OS controller.

Referring to FIG. 2, the multi-OS controller 113 is constructed as shown therein.

In FIG. 2, the multi-OS controller 113 includes computer resource dividing means 201, inter-OS communicating means 202, computer controlling means 203, OS scheduling means 204, second OS starting means 205, an interface 206 operable between the first OS software environment and the multi-OS controller and between the second OS software environment and the multi-OS controller, and a common memory region 207 used in common for programs operating on the first and second OS's. In the present embodiment, the multi-OS controller 113 is constructed as a device driver of the first OS 105.

The computer resource dividing means 201 manages computer resources such as the CPU, memories, external device and timer of the monitored computer 101, and offers divisions of the computer resources to the first and second OS's 105 and 112.

The inter-OS communicating means 202 is means for implementing communication between the programs operating in the software environments of the individual OS's, so that the program operating in the software environment of one OS can communicate with the program operating in the software environment of the other OS through the inter-OS communicating means. The inter-OS communicating means 202 provides, as one of communication methods, a method for mapping the common memory region 207 on the programs operating on the individual OS's. The programs operating on the individual OS's can communicate with each other by updating or referring data in the common memory region.

In the present embodiment, the common memory region 207 has regions in which alive message arrival flag 208, fault decision value 209 and signal lapse value 210 are set, respectively.

The alive message arrival flag 208 is set to "1" when the first fault monitor agent 104 transmits an alive message 109 indicative of normal operation of the first OS and is set to "0" when the second fault monitor agent 108 checks the alive message for its arrival. Thus, as far as the alive message 109 has arrived, the alive message arrival flag 208 becomes "1" and as far as the alive message 109 has not arrived, the alive message arrival flag 208 becomes "0".

The signal lapse value 210 indicates a lapse of time starting with setting of the alive message arrival flag 208 to "0". In the present embodiment, the second fault monitor agent is periodically executed so that the signal lapse value 210 may indicate the number of times by which the second fault monitor agent checks the alive message arrival flag 208 and a lapse of time starting with the time that the alive message arrival flag 208 changed to "0".

The fault decision value 209 is a reference value for deciding that a fault occurs in the first OS software environment 102. In the present embodiment, the value 209 indicates the number of times by which the alive message arrival flag 208 is consulted before the second fault monitor agent determines the fault. The fault is determined by comparing the fault decision value 209 with the signal lapse value 210.

The computer controlling means 203 includes restarting means, memory information collecting means, register information collecting means and fault information collection starting means.

The OS scheduling means 204 executes scheduling of the first and second OS's 105 and 112. The OS scheduling means 204 hooks all interruptions generated in the computer 101, decides in accordance with a cause of interruption which OS the control operation is handed over to and starts an interruption handler of an OS to which the control operation is handed.

In the present embodiment, in case an interruption for handing the control operation to the second OS 112 is generated, operation of the first OS 105 is interrupted and the control operation is handed over to the second OS 112. In other words, in the present embodiment, scheduling for preferential handling of the second OS 112 is carried out.

When an interruption, by which the control operation is required to be handed over to the second OS 112, is generated during operation of the first OS software environment 102, the multi-OS controller 113 interrupts the process in the first OS 105 and hands the control operation to the second OS 112 while keeping the process in the first OS in the interrupted state. When returning the control operation from the second OS 112 to the first OS 105, the multi-OS controller 113 recovers the kept state of the first OS 105, causing the first OS 105 to revert.

The second OS starting means 205 loads the second OS 112 on a memory and starts the second OS 112.

Figure 3:
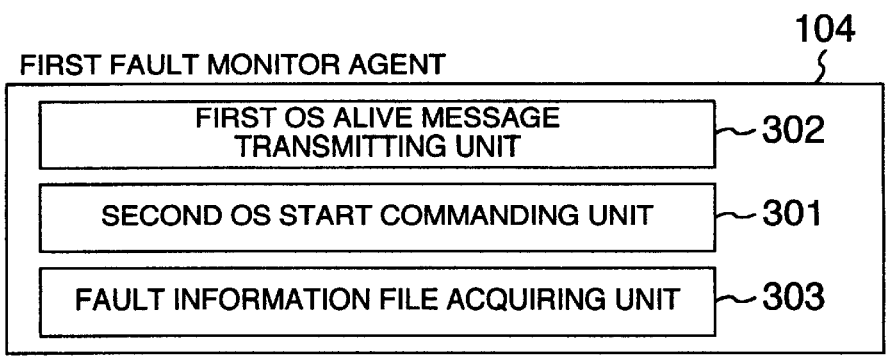
FIG. 3 is a diagram showing a program structure of a first fault monitor agent.

FIG. 3 shows a program structure of the first fault monitor agent 104.

The first fault monitor agent 104 has second OS start commanding means 301, first OS alive message transmitting means 302 and fault information file collecting means 303.

The second OS start commanding means 301 commands, through the second OS starting means 205, the multi-OS controller 113 to start the second OS 112.

The first OS alive message transmitting means 302 periodically transmits an alive message 109 indicating that the first OS 105 operates normally to the second OS 112 through the inter-OS communicating means 202 of multi-OS controller 113. In the present embodiment, transmission of the alive message can be implemented by setting "1" to the alive message arrival flag 208.

The fault information collecting means 303 reads a fault information file collected by the fault information collecting means 106 of the first OS 105 and stored in, for example, an external storage and transfers the read-out file to the second fault monitor agent 108.

Figure 4:
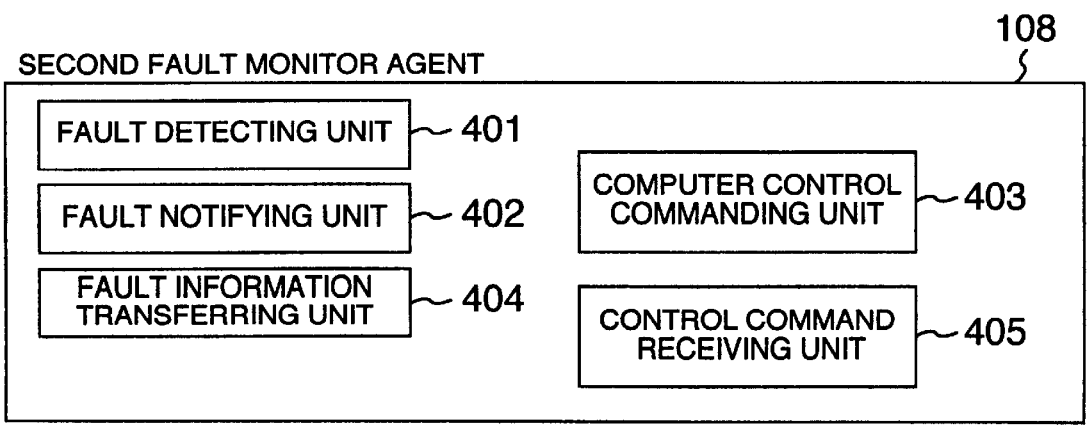
FIG. 4 is a diagram showing a program structure of a second fault monitor agent.

FIG. 4 shows a program structure of the second fault monitor agent 108.

The second fault monitor agent 108 has fault detecting means 401, fault notifying means 402, computer control commanding means 403, fault information transferring means 404 and control command receiving means 405.

The fault detecting means 401 decides whether the alive message 109 from the first fault monitor agent 104 is received before a predetermined fault detection time expires. If the alive message 109 is not received, the fault detecting means 401 determines that a fault occurs in the first OS software environment 102.

When the fault detecting means 401 determines the occurrence of the fault in the first OS software environment 102, the fault notifying means 402 informs the monitoring computer 115 of the fault occurrence through the communicating means 110.

The computer control commanding means 403 responds to the contents of the command from the monitoring computer 115 to call the computer controlling means 203 of multi-OS controller 113.

The fault information transferring means 404 transfers the fault information collected from the first fault monitor agent 104 or multi-OS controller 113 to the fault monitor manager 116 of monitoring computer 115 through the communicating means 110.

The control command receiving means 405 receives a request for controlling the monitored computer 101 commanded from the fault monitor manager 116 to call the computer control commanding means 403 in accordance with the contents of the request.

Figure 5:
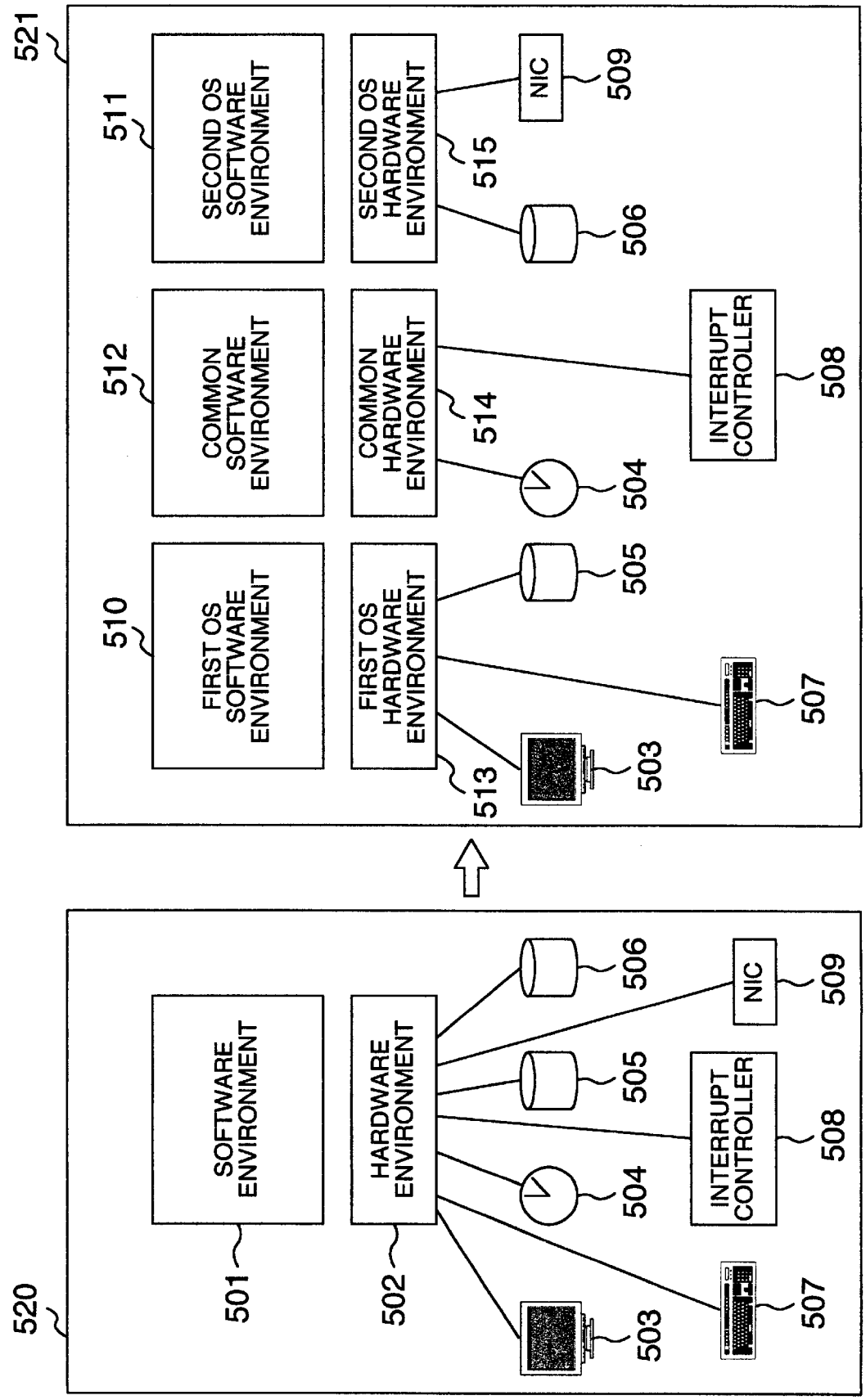
FIG. 5 is a diagram showing an image of division of computer resources by computer resource dividing means.

Turning to FIG. 5, there is illustrated an image of division of computer resources by the computer resource dividing means 201.

Designated at 520 in FIG. 5 is an ordinary computer image. As a hardware environment 502 of the computer, there are provided a display 503, a keyboard 507, a system timer 504, an interruption controller 508, external storages 505 and 506 and a network interface controller (NIC) 509. On the hardware environment 502 as above, a single software environment 501 operates.

Computer image 521 is a computer image constructed by the computer resource dividing means 201. In the computer image 521, the hardware environment 502 is divided into a hardware environment 513 of the first OS, a hardware environment 515 of the second OS and a common hardware environment 514 used in common for the first and second OS's. In the figure, the display 503, keyboard 507 and external storage 505 are assigned to the hardware environment 513. Assigned to the hardware environment 515 are the external storage 506 and NIC 509 and assigned to the common hardware environment 514 are the system timer 504 and interruption controller 508. Software environments 510 and 511 dedicated to the first and second OS's and a software environment 512 for the common portion operate on the thus divided hardware environments, respectively. Though not illustrated in the figure, the memory owned by the computer is also divided into memory regions dedicated to the first and second OS's and for the common portion, respectively. The CPU possessed by the computer is used for the software environment of each OS on time division base.

Figure 6:
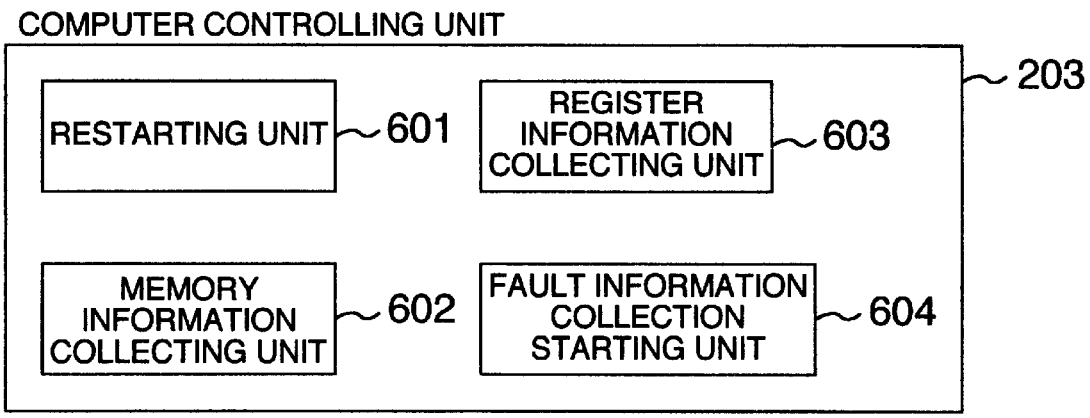
FIG. 6 is a diagram showing a program structure of computer controlling means.

FIG. 6 shows a program structure of the computer controlling means 203.

The computer controlling means 203 has restarting means 601, memory information collecting means 602, register information collecting means 603 and fault information collection starting means 604. The restarting means 601 resets the monitored computer 101 and restarts the computer. The memory information collecting means 602 collects the contents of a memory used by the first OS 105. The register information collecting means 603 collects register information of the first OS saved when the control operation shifts from the first OS 105 to the second OS 112. The register information is saved by means of the multi-OS controller 113. The fault information collection starting means 604 is means for calling the fault information collecting means owned by the first OS 105 from the multi-OS controller 113.

Figure 7:
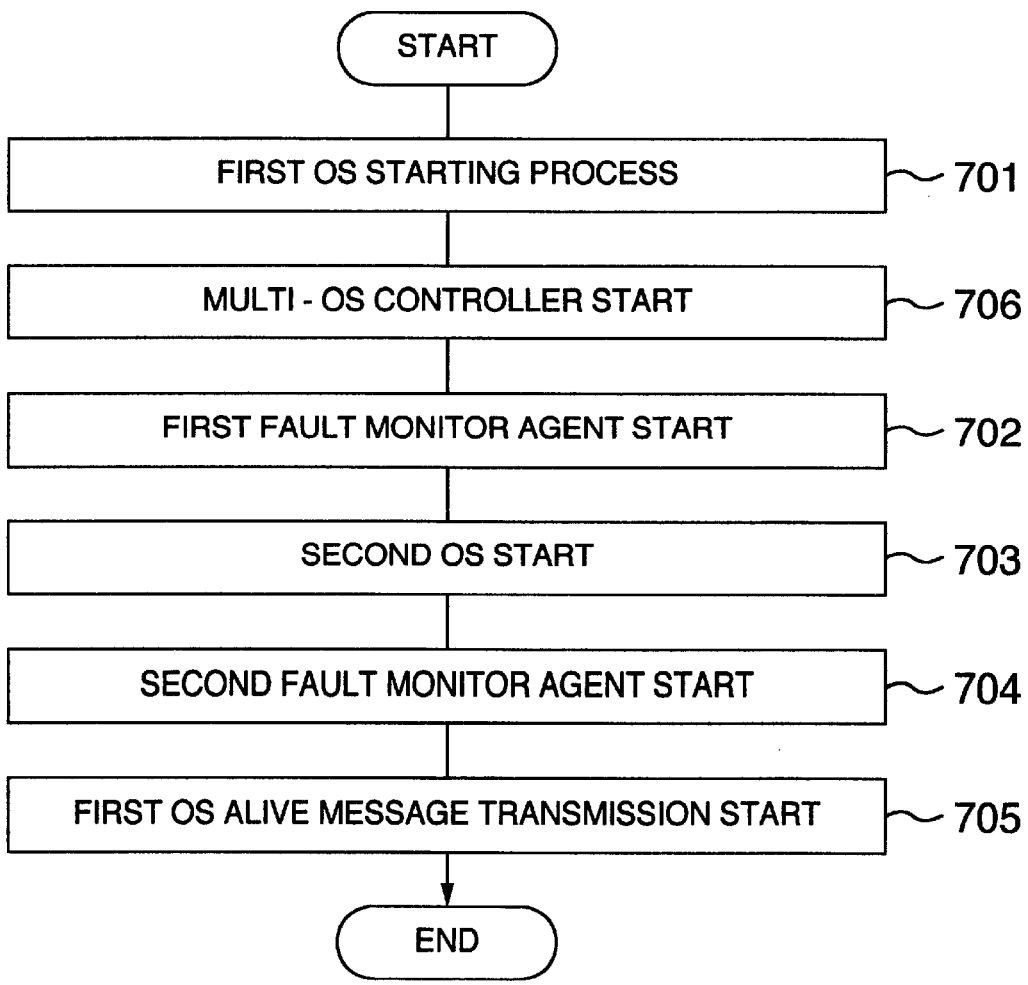
FIG. 7 is a flow chart showing the procedures in a process carried out before the first fault monitor agent of the monitored computer starts to transmit a first OS alive message.

Referring now to FIG. 7, there is illustrated a flow chart showing the procedures of a process carried out before the first fault monitor agent 104 of monitored computer 101 transmits an alive message 109 of the first OS.

When the monitored computer 101 is started, the first OS 105 is first started (step 701). Subsequently, the multi-OS controller 113 is started. When started, the multi-OS controller 113 divides the computer resources such as the memories, display, keyboard and timer into the computer resources for the first OS, second OS and common portion to the first and second OS's, respectively, as shown in FIG. 5 by referring a construction management file not shown (step 706).

Thereafter, the first fault monitor agent 104 is started. When stared, the first fault monitor agent 104 causes the second OS start commanding means 301 to issue a request for starting the second OS 112 to the multi-OS controller 113 (step 702).

Receiving the request for starting the second OS 112, the multi-OS controller 113 loads the second OS 112 on the memory through the second OS starting means 205 and starts it. Upon start of the second OS, a boot process such as initialization of the second OS per se is executed (step 703).

When the second OS 112 is set up, the second fault monitor agent 108 is started. The second fault monitor agent 108 is started as an application program operating on the second OS 112. With the second fault monitor agent 108 started, the fault detecting means 401, fault notifying means 402, computer control commanding means 403, fault information transferring means 404 and control command receiving means 405 are initialized. In this phase, the second fault monitor agent 108 may inform, through the communicating means 110, the monitoring computer 115 that the monitored computer 110 is started (step 704).

After the above process, the first fault monitor agent 104 starts to transmit to the second fault monitor agent 108 an alive message 109 indicating that the first OS 105 operates normally. The first fault monitor agent 104 transmits the alive message 109 for the first OS 105 through the inter-OS communicating means 202 of multi-OS controller 113. It should be understood that in the phase of completion of the process in step 704, the second fault monitor agent 108 has ended preparation for reception of the alive message 109 (step 705).

Figure 8:
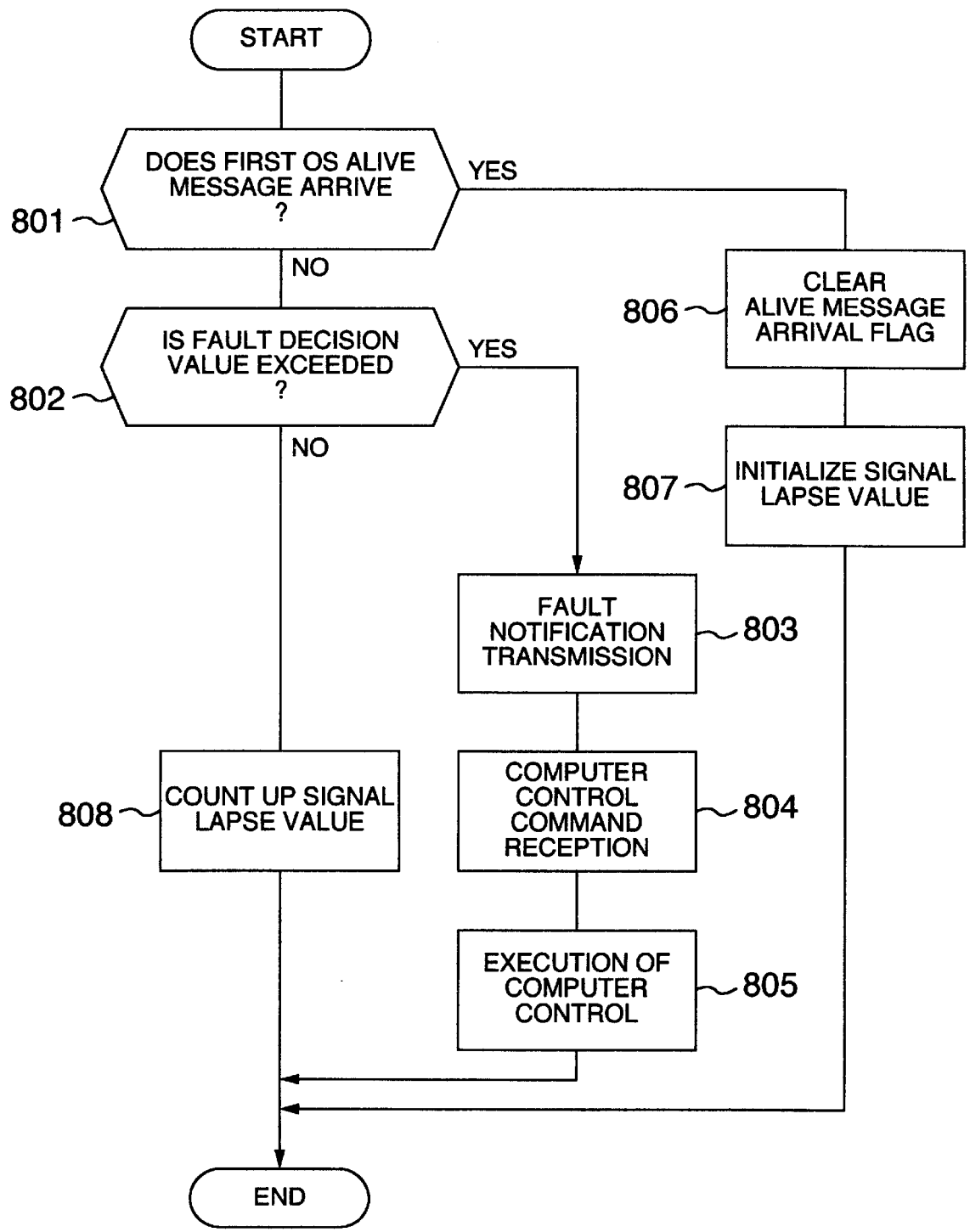
FIG. 8 is a flow chart showing the flow of a fault detection process by fault detecting means of the second fault monitor agent.

Referring to FIG. 8, there is illustrated a flow chart showing the flow of a fault detection process by the fault detecting means 401 of the second fault monitor agent.

The first fault monitor agent 104 is executed periodically to transmit the alive message 109 for the first OS 105 through the first OS alive message transmitting means 302. The second fault monitor agent 108 periodically refers to the alive message arrival flag 208 to check whether the alive message arrives (step 801).

In case the alive message 109 arrives, the second fault monitor agent 108 clears the alive message flag 208 (step 806) and sets the signal elapse value 210 to "0" (step 807).

On the other hand, when it is determined in the step 801 that the alive message does not arrive, the second fault monitor agent 108 checks whether the signal elapse value 210 exceeds the fault decision value 209 (step 802). If the signal elapse value 210 does not exceed the fault decision value 209, the second fault monitor agent 108 adds "1" to the signal lapse value 210 and waits for coming of the next operation period.

If the signal elapse value 210 exceeds the fault decision value 209, the second fault monitor agent 108 determines that a fault occurs in the first OS software environment and transmits a fault notification to the monitoring computer 115 through the communicating means 110 (step 803).

Receiving the fault notification, the fault monitor manager 116 of monitoring computer 115 transmits a computer control command to the second fault monitor agent 108 in order to command operation of the monitored computer 101 after the occurrence of the fault. The second fault monitor agent 108 receives the computer control command (step 804).

After receiving the computer control command from the fault monitor manager 116, the second fault monitor agent 108 executes the control operation of the monitored computer 101 in accordance with the command. In the present embodiment, any one of restart of the monitored computer 101, memory information collection, register information collection, fault information collection starting and collection of fault information collected by the first OS is commanded, as the computer control command, to the monitored computer 101 (step 805).

Figure 9:
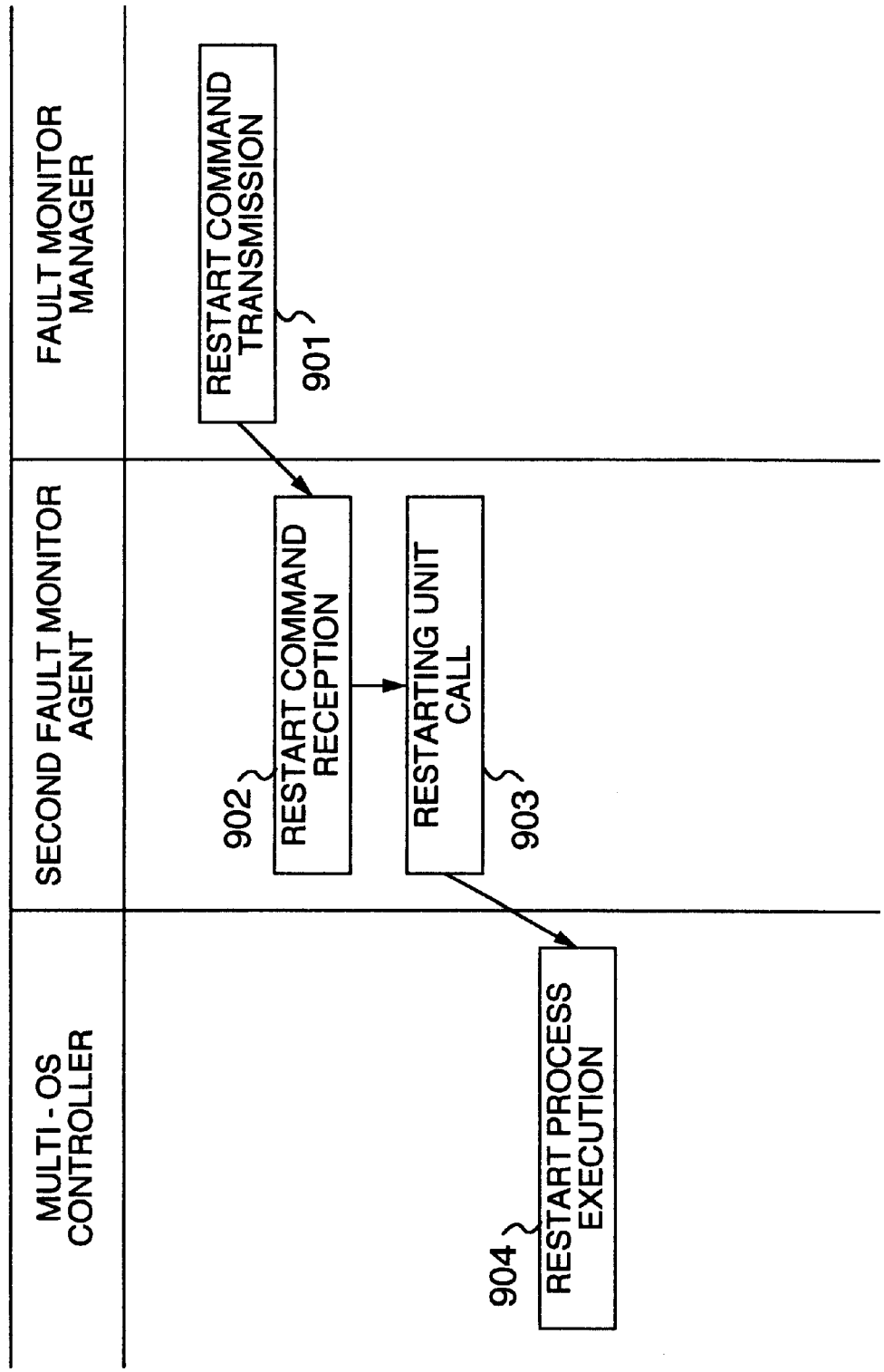
FIG. 9 is a sequence diagram showing the flow of a process when a fault monitor manager restarts a monitored computer.

Referring now to FIG. 9, there is illustrated a sequence diagram showing the flow of a process when the fault monitor manager 116 performs restarting of the monitored computer 101. In the figure, shifting of the process from the fault monitor manger 116 to the second fault monitor agent 108 is executed through the communicating means 110 of monitored computer 101 and the communicating means 117 of monitoring computer 115 and shifting of the process from the second fault monitor agent 108 to the multi-OS controller 113 is executed through the interface 206 of multi-OS controller 113.

For restarting the monitored computer 101, a restart commanding request is transmitted from the fault monitor manger 116 to the second fault monitor agent 108 (step 901).

Receiving the restart commanding request (step 902), the second fault monitor agent 108 of monitored computer 101 calls the restarting means 601 of the multi-OS controller 113 (step 903).

When called by the second fault monitor agent 108, the restarting means 601 executes restarting of the monitored computer 101 (step 904).

Figure 10:
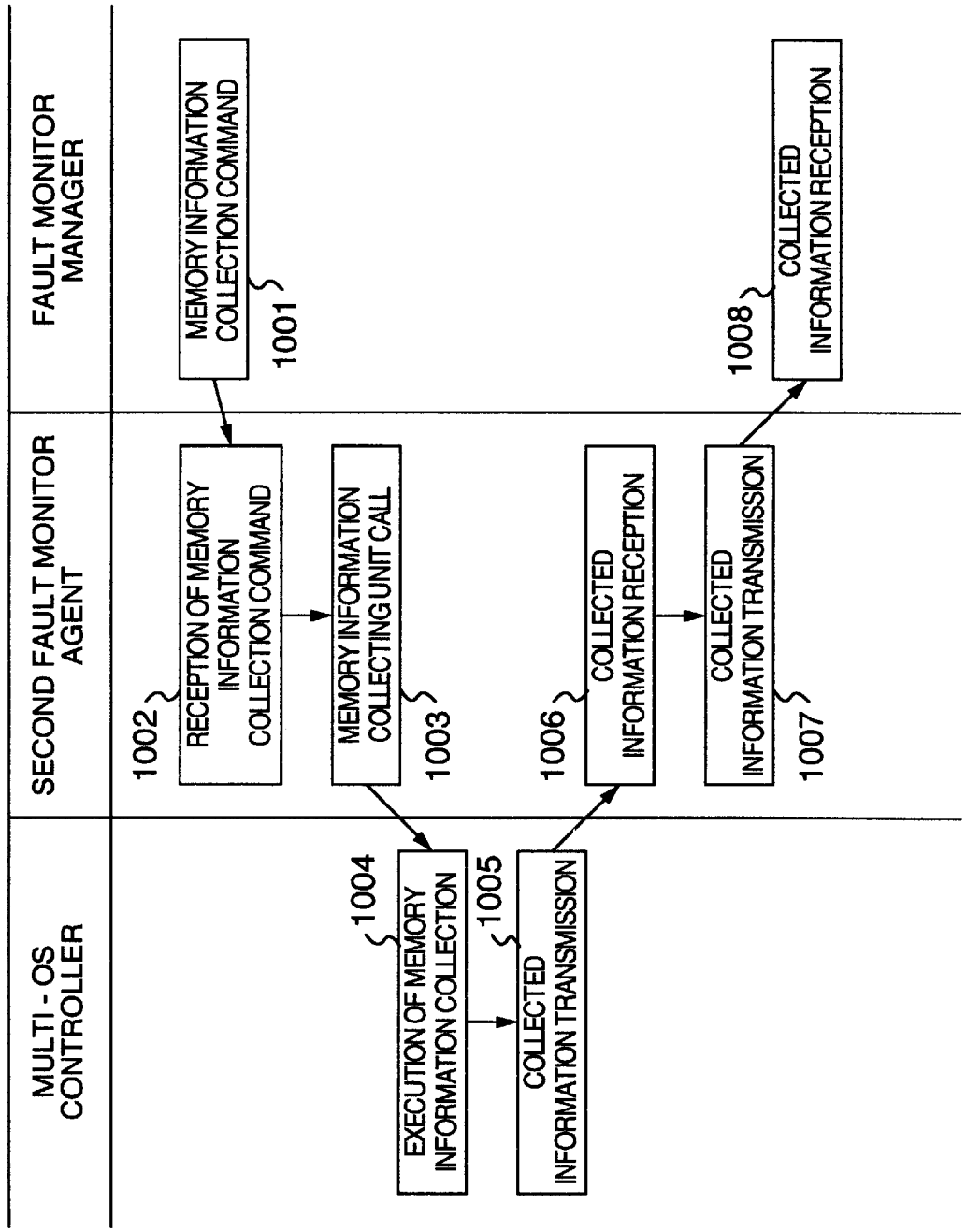
FIG. 10 is a sequence diagram showing the flow of a process when the fault monitor manager collects memory information in a software environment of a first OS operating on the monitored computer.

Turning to FIG. 10, there is illustrated a sequence diagram showing the flow of a process when the fault monitor manger 116 collects memory information in the software environment 102 of first OS operating on the monitored computer 101. Shifting of the process between the fault monitor manager 116 and the second fault monitor agent 108 is executed through the communicating means 110 of monitored computer 101 and the communicating means 117 of monitoring computer 115 and shifting of the process between the second fault monitor agent 108 and the multi-OS controller 113 is executed through the interface 206 of the multi-OS controller 113.

In case collection of memory information in the first OS software environment 102 becomes necessary, the fault monitor manager 116 transmits to the second fault monitor agent 108 a request for collecting memory information concerning the software environment of the first OS 105. This request asks for address (virtual address or physical address) and size of the memory information in the first OS software environment 102 (step 1001).

Receiving the memory information collection commanding request (step 1002), the second fault monitor agent 108 calls the memory information collecting means 602 of multi-OS controller 113 (step 1003).

The memory information collecting means 602 thus called from the second fault monitor agent 108 reads memory information corresponding to the address and size designated by the memory information collection commanding request (step 1004). The memory information read by the memory information collecting means 602 is transferred to the second fault monitor agent 108 by means of the memory information collecting means 602 (step 1005).

When receiving the memory information from the memory information collecting means 602 (step 1006), the second fault monitor agent 108 transmits the memory information to the monitoring computer 115 (step 1007). The fault monitor manger 116 receives the memory information thus transferred to the monitoring computer 115 (step 1008).

A process, which is carried out in order for the fault monitor manager 116 to collect register information of the first OS 105 immediately before transfer of the control operation to the second OS 112 when a fault in the first OS 105 is detected by the second fault monitor agent 108, is performed similarly to the aforementioned collection of the memory information. More specifically, this process can be implemented through the procedure substantially similar to the flow chart shown in FIG. 10 by replacing, in the aforementioned memory information collection, a request from the fault monitor manager 116 with a request for commanding collection of register information, by replacing information to be collected with the register information and by collecting information by means of the register information collecting means 603 in place of the memory information collecting means 602. The register information collecting means 603 collects the register information of first OS 105 saved in a predetermined region of the memory when the multi-OS controller 113 changes the first OS software environment with the second OS software environment.

Figure 11:
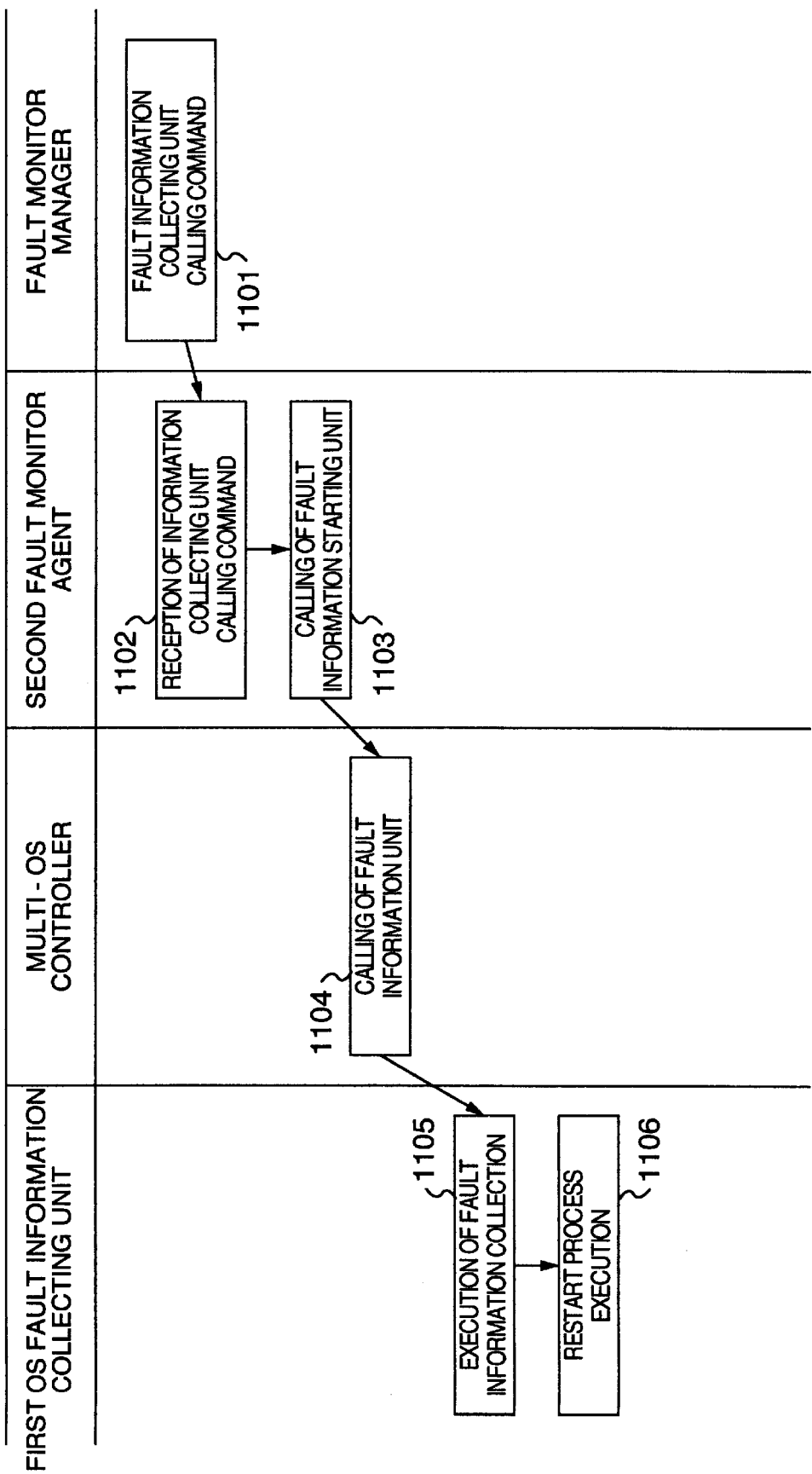
FIG. 11 is a sequence diagram showing the flow of a process carried out when the fault monitor manager commands starting of fault information collection.

Referring to FIG. 11, there is illustrated a sequence diagram showing the flow of a process carried out when the fault monitor manager 116 commands starting of fault information collection. Shifting of the process from the fault monitor manager 116 to the second fault monitor agent 108 is executed through the communicating means 110 of monitored computer 101 and communicating means 117 of monitoring computer 115 and shifting of the process from the second fault monitor agent 108 to the multi-OS controller 113 as well as from the multi-OS controller 113 to the first OS fault information collecting means 106 is executed through the interface 206 of multi-OS controller 113.

When the fault monitor manager 116 issues a command to call the fault information collecting means 106 of the first OS (step 1101), the second fault monitor agent 108 receives the command (step 1102). The second fault monitor agent 108 responds to the call command from the fault information collecting means 106 to call the fault information collection starting means 604 of the multi-OS controller 113 (step 1103). The thus started fault information collection starting means 604 calls in turn the fault information collecting means 106 of the first OS (step 1104).

When called, the fault information collecting means 106 collects fault information concerning the fault generated in the first OS 105. Specifically, the fault information to be collected means, for example, dump information of the software environment of the first OS 105. The fault information collecting means 106 stores the collected fault information in a predetermined region of, for example, the external storage (step 1105). When the collection of the fault information ends, the first OS fault information collecting means 106 restarts the monitored computer 101 (step 1106).

Figure 12:
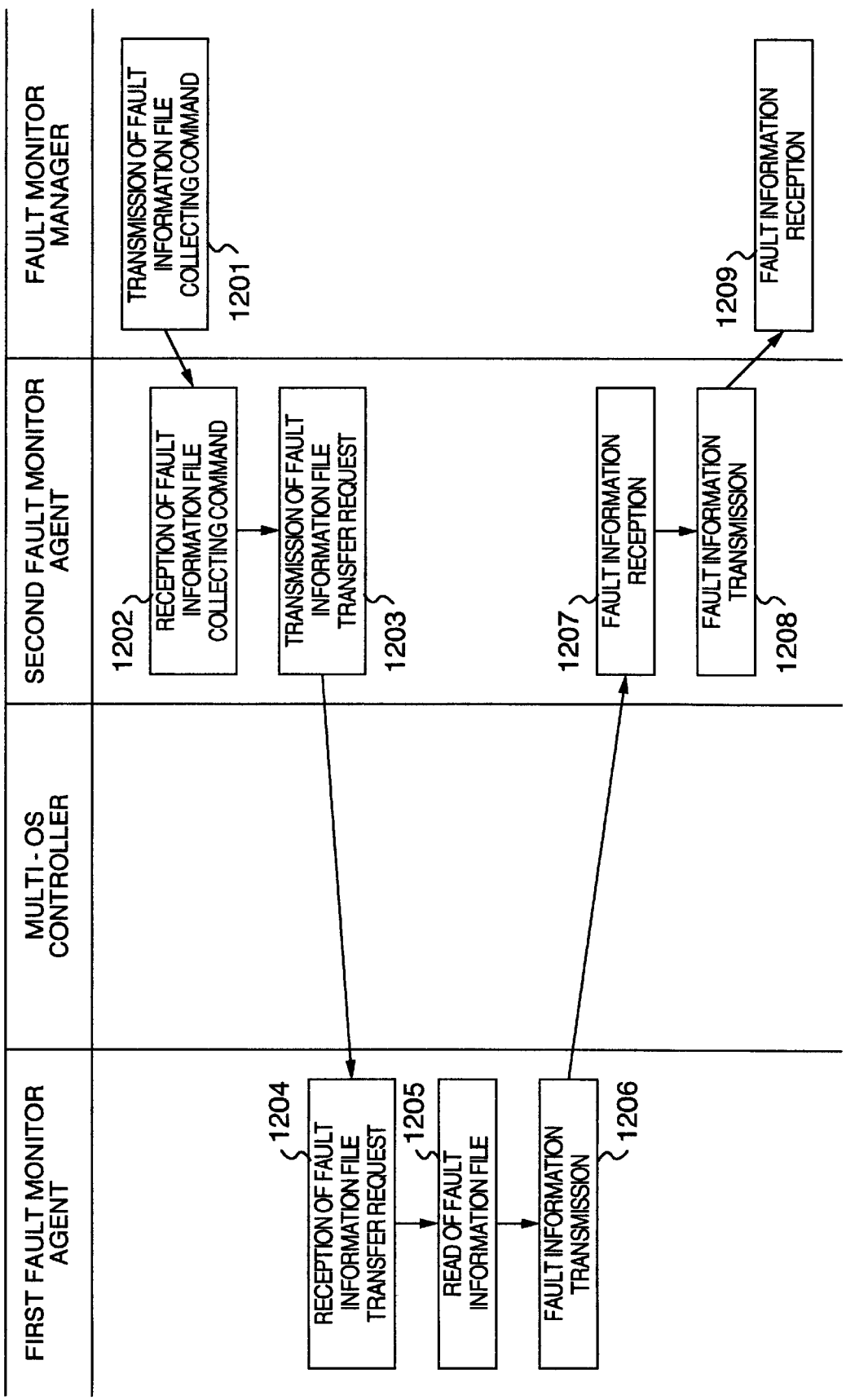
FIG. 12 is a sequence diagram showing the flow of a process carried out when the fault monitor manager collects fault information collected by fault information collecting means of the first OS.

Referring now to FIG. 12, there is illustrated a sequence diagram showing the flow of a process carried out when the fault monitor manager 116 collects the fault information collected by the fault information collecting means 106 of first OS. Shifting of the process between the fault monitor manager 116 and the second fault monitor agent 108 is executed through the communicating means 110 of monitored computer 101 and the communicating means 117 of monitoring computer 115 and shifting of the process between the second fault monitor agent 108 and the first fault monitor agent 104 is executed through the inter-OS communicating means 202 of multi-OS controller 113.

When collecting the fault information collected by the first OS fault information collecting means 106, the fault monitor manager 116 transmits a command to collect the fault information to the second fault monitor agent 108 (step 1201).

Receiving the collection command request (step 1202), the second fault monitor agent 108 requests, through the inter-OS communicating means 202 of the multi-OS controller 113, the first fault monitor agent 104 to transfer a fault information file collected by the fault information collecting means 106 (step 1203).

Receiving the request for transfer of the fault information file from the second fault monitor agent 108 (step 1204), the first fault monitor agent 104 reads the fault information file collected by the fault information collecting means 106 through the fault information file collecting means 303 (step 1205). The first fault monitor agent transmits the thus read fault information file to the second fault monitor agent 108 (step 1206).

The second fault monitor agent 108 receives the fault information file from the first fault monitor agent 104 (step 1207) and transfers it to the fault monitor manger 116 (steps 1208 and 1209).

According to the embodiment described so far, in the event that a software fault occurs in the first OS software environment on the monitored computer, a fault notification is transmitted to the monitoring computer connected to the monitored computer through the network and control of the monitored computer can be executed in accordance with a command from the monitoring computer. Since the program can operate in the second OS software environment even when a fault takes place in the first OS software environment, the multi-OS controller can operate in cooperation with the program operating in the second OS software environment to cause the monitoring computer connected through the network to command restarting of the monitored computer, collection of the memory information or register information in the first OS software environment and collection of the first OS fault information. In addition, in the present embodiment, after restart of the monitored computer, the fault information collected by the first OS can be transmitted to the monitoring computer.

By installing a mail server for practicing electronic mail (E-mail) delivery between the monitored computer and the monitoring computer in the computer system described above, the fault notification and the computer control can be accomplished through E-mail. A second embodiment utilizing E-mail as communicating means will be described hereunder.

Figure 17:
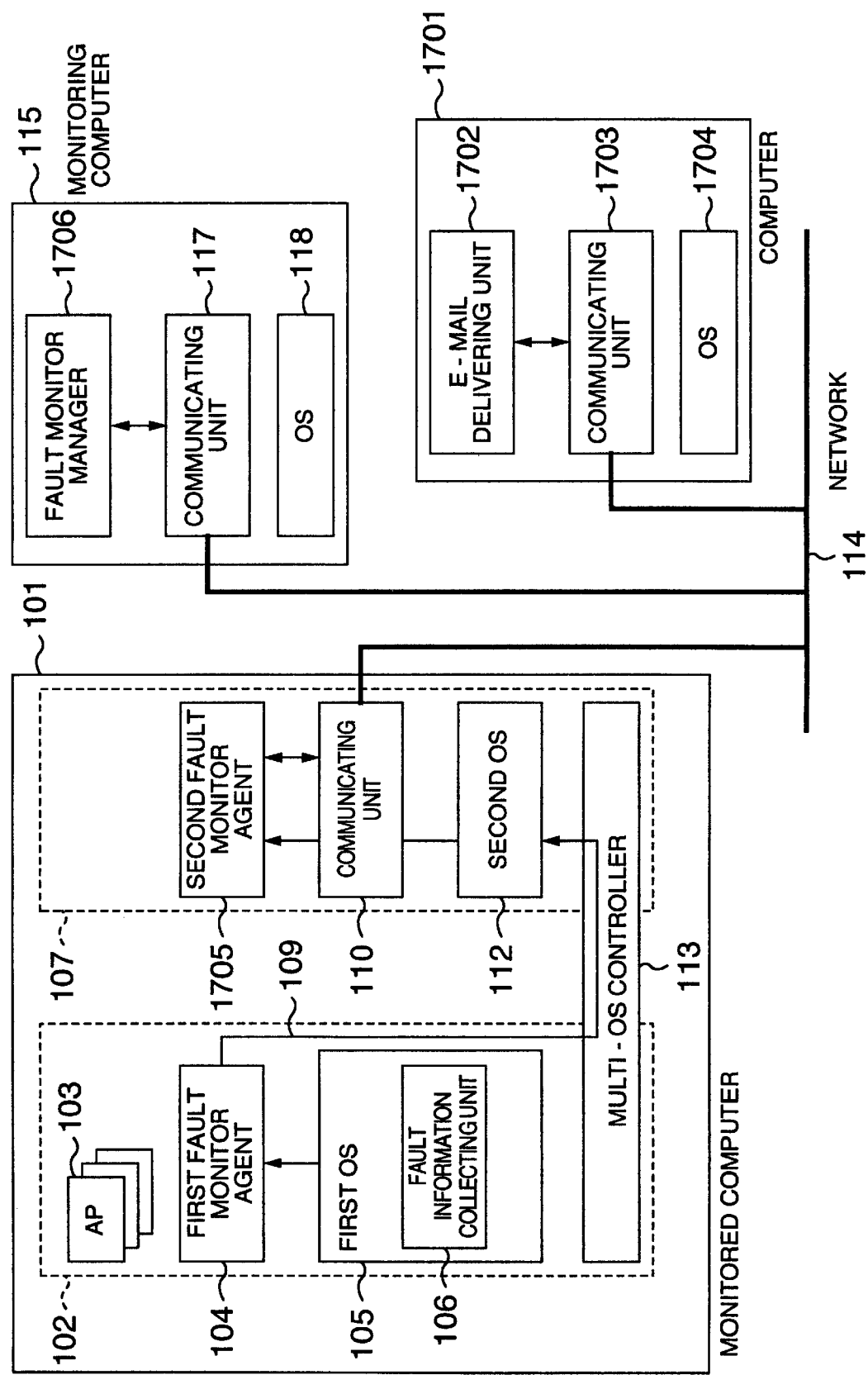
FIG. 17 is a block diagram showing the construction of a fault monitoring system according to a second embodiment.

Referring now to FIG. 17, the construction of a fault monitoring system according to the second embodiment is illustrated in block form. In the figure, components functioning similarly to those in the first embodiment will be designated by identical reference numerals to those in FIG. 1 and will not be described.

In the present embodiment, in addition to monitored computer 101 and monitoring computer 115, a computer 1701 functioning as a mail server is connected to a network 114. The computer 1701, on which an OS 1704 operates, includes communicating means 1703 for communication with other computers through the network 114. The computer 1701 further includes E-mail delivering means 1702. When receiving E-mail, the E-mail delivering means 1702 checks a designated mail address. If the mail address is one managed by the E-mail delivering means, it is held in the computer 1701 but if not so, it is transferred to mail delivering means of another computer. In case E-mail transmitting/receiving means having a mail address managed by the E-mail delivering means 1702 makes a mail inquiry (inquiry as to whether E-mail has arrived) to the E-mail delivering means and there is E-mail destined for the inquired mail address, the E-mail delivering means transfers the E-mail in question.

A second fault monitor agent 1705 operating in a second OS software environment 107 of the monitored computer 101 has, in addition to the function owned by the second fault monitor agent 108 in the first embodiment, E-mail transmitting/receiving means for transmission/reception of E-mail and E-mail preparing means. Similarly, a fault monitor manager 1706 operating on the monitoring computer 115 has, in addition to the function owned by the fault monitor manager 116 in the first embodiment, E-mail transmitting/receiving means for transmission/reception of E-mail and E-mail preparing means.

In the present embodiment, a mail address used during E-mail transmission/reception by the second fault monitor agent 1705 and a mail address used during E-mail transmission/reception by the fault monitor manager 1706 have already been allotted in the E-mail delivering means 1702 and E-mail transmitted to each of the mail addresses is stored in the computer 1701.

Figure 18:
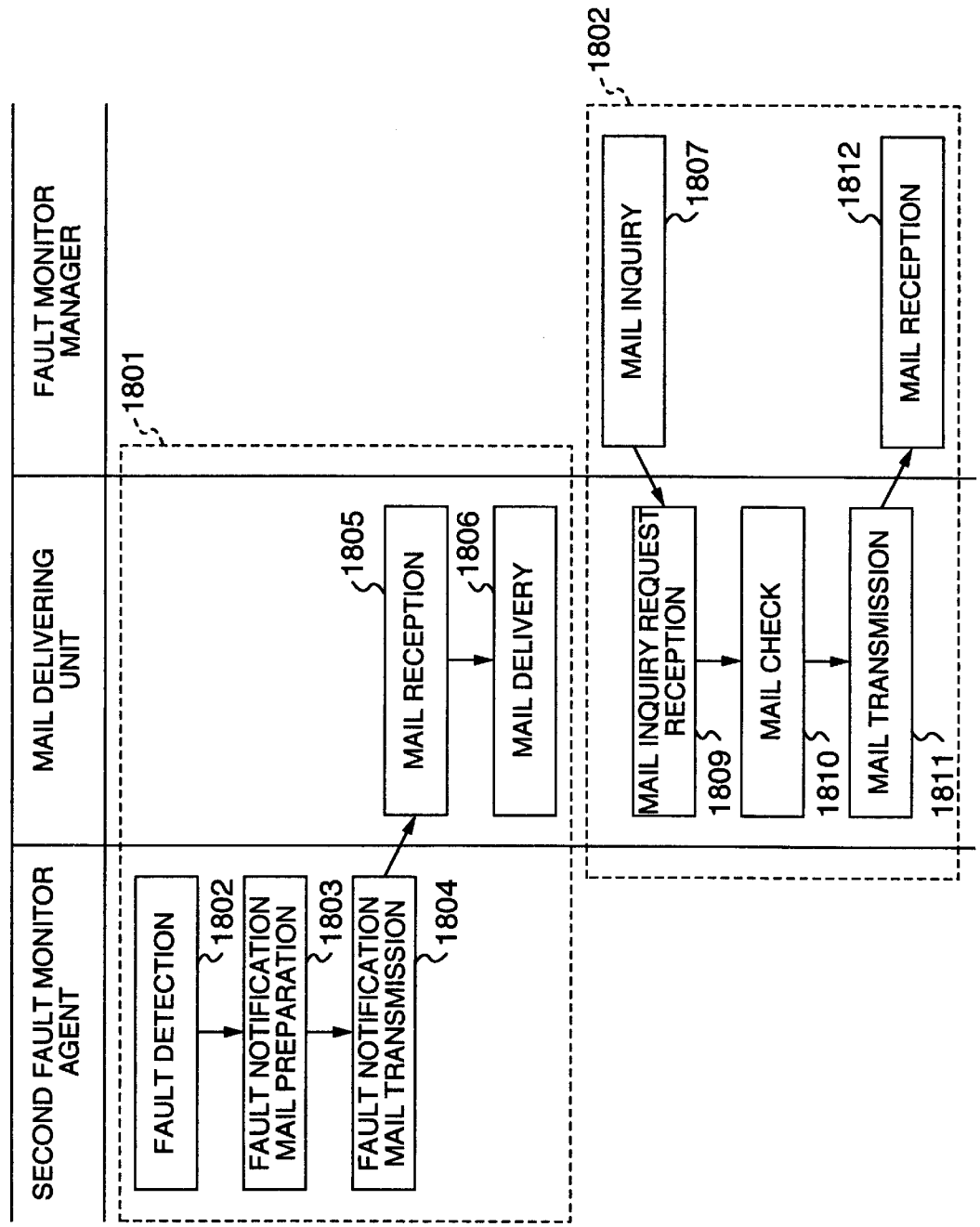
FIG. 18 is a sequence diagram showing the flow of a process in which a fault notification is transmitted from the second fault monitor agent by E-mail and the fault monitor manager receives E-mail.

Turning to FIG. 18, there is illustrated a sequence diagram showing the flow of a process in which a fault notification is transmitted from the second fault monitor agent 1705 and the fault monitor manager 1706 receives E-mail.

In FIG. 18, the flow of a process in which the second fault monitor agent 1705 transmits E-mail for fault notification is indicated in block 1801 and the flow of a process in which the fault monitor manager 1706 receives E-mail for fault notification is indicated in block 1802.

When detecting a fault (step 1802), the second fault monitor agent 1705 prepares E-mail for fault notification (step 1803) and designates a mail address of the fault monitor manager 1706 so as to transmit E-mail (step 1804).

The E-mail transmitted in the step 1804 is received by the E-mail delivering means 1702 (step 1805) and held, as E-mail destined for the designated mail address, in the computer 1701 (step 1806).

The fault monitor manager 1706 periodically makes inquiries to the E-mail delivering means 1702 to check whether E-mail arrives (step 1807). When receiving an inquiry request (step 1809), the E-mail delivering means 1702 checks whether E-mail destined for the mail address of the inquiry originator, that is, fault monitor manager 1706 has arrived (step 1810). If arrival of the E-mail destined for the mail address of the fault monitor manager 1706 is determined, the E-mail delivering means 1702 transfers the mail to the fault monitor manager 1706 (step 1811). The E-mail transferred to the fault monitor manager 1706 is erased from the computer 1701. The fault monitor manager 1706 receives the E-mail transferred from the E-mail delivering means 1702 (step 1812).

Figure 19:
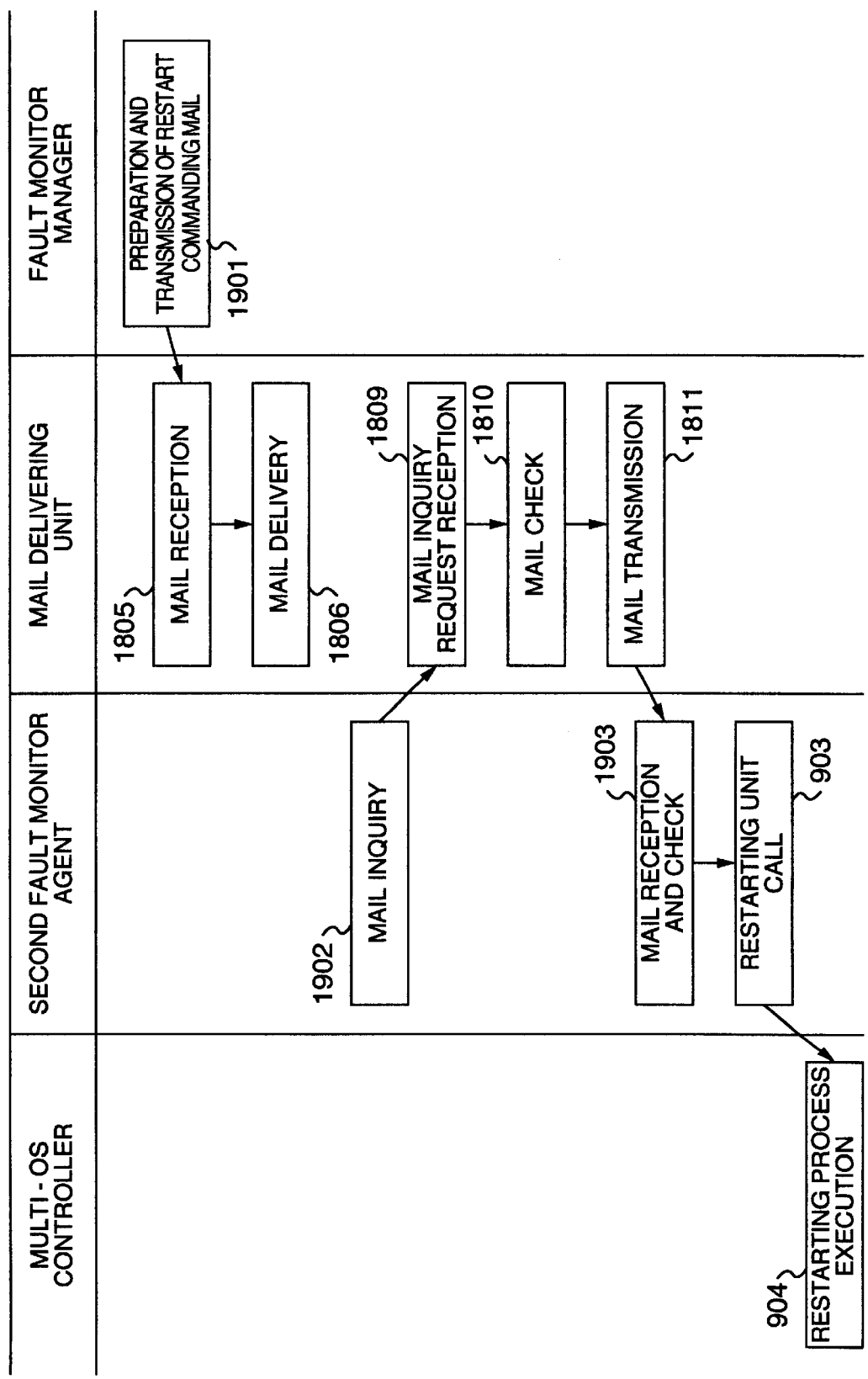
FIG. 19 is a flow chart showing the flow of a process when the fault monitor manager restarts the monitored computer through E-mail.

Referring now to FIG. 19, there is illustrated a flow chart showing the flow of a process carried out when the fault monitor manager 1706 restarts the monitored computer 101 through E-mail.

For restarting the monitored computer 101, the fault monitor manager 1706 prepares for restart commanding mail and transmits E-mail destined for the second fault monitor agent 1705 (step 1901).

The E-mail transmitted from the fault monitor manager 1706 is received by the E-mail delivering means 1702 (step 1805) and held, as E-mail destined for the second fault monitor agent 1705, in the computer 1701 (step 1806).

The second fault monitor agent 1705 periodically inquires of the E-mail delivering means 1702 whether E-mail has arrived (step 1902). Receiving an inquiry from the second fault monitor agent 1705 (step 1809), the E-mail delivering means 1702 checks the mail held in the computer 1701 to examine whether E-mail destined for the second fault monitor agent 1705 has arrived (step 1810). In the presence of the E-mail in question, the E-mail delivering means 1702 transfers the E-mail to the second fault monitor agent 1705 and erases the thus transferred E-mail(step 1811).

When receiving the transferred E-mail, the second monitor agent 1705 checks the contents of the E-mail (step 1903). In case the received E-mail is one for commanding restart, the second fault monitor agent 1705 calls the restarting means of the multi-OS controller 113 (step 903). The restarting means of the multi-OS controller 113 called from the second fault monitor agent 1705 executes restarting of the monitored computer 101 (step 904).

Like restarting the monitored computer 101, collecting the memory information or register information in the first OS software environment operating on the monitored computer 101 from the fault monitor manager 1706 or collecting the fault monitor information collected by the first OS can also implemented by using E-mail.

As described above, by using E-mail for fault notification and control of restarting of the monitored computer, such a terminal unit as portable or mobile telephone capable of transmitting/receiving E-mail can be utilized in place of the monitoring computer. A fault monitoring system using a portable telephone 2002 with E-mail transmitting/receiving means in place of the monitoring computer 115 in FIG. 17 is constructed as shown in block form in FIG. 20.

Figure 20:
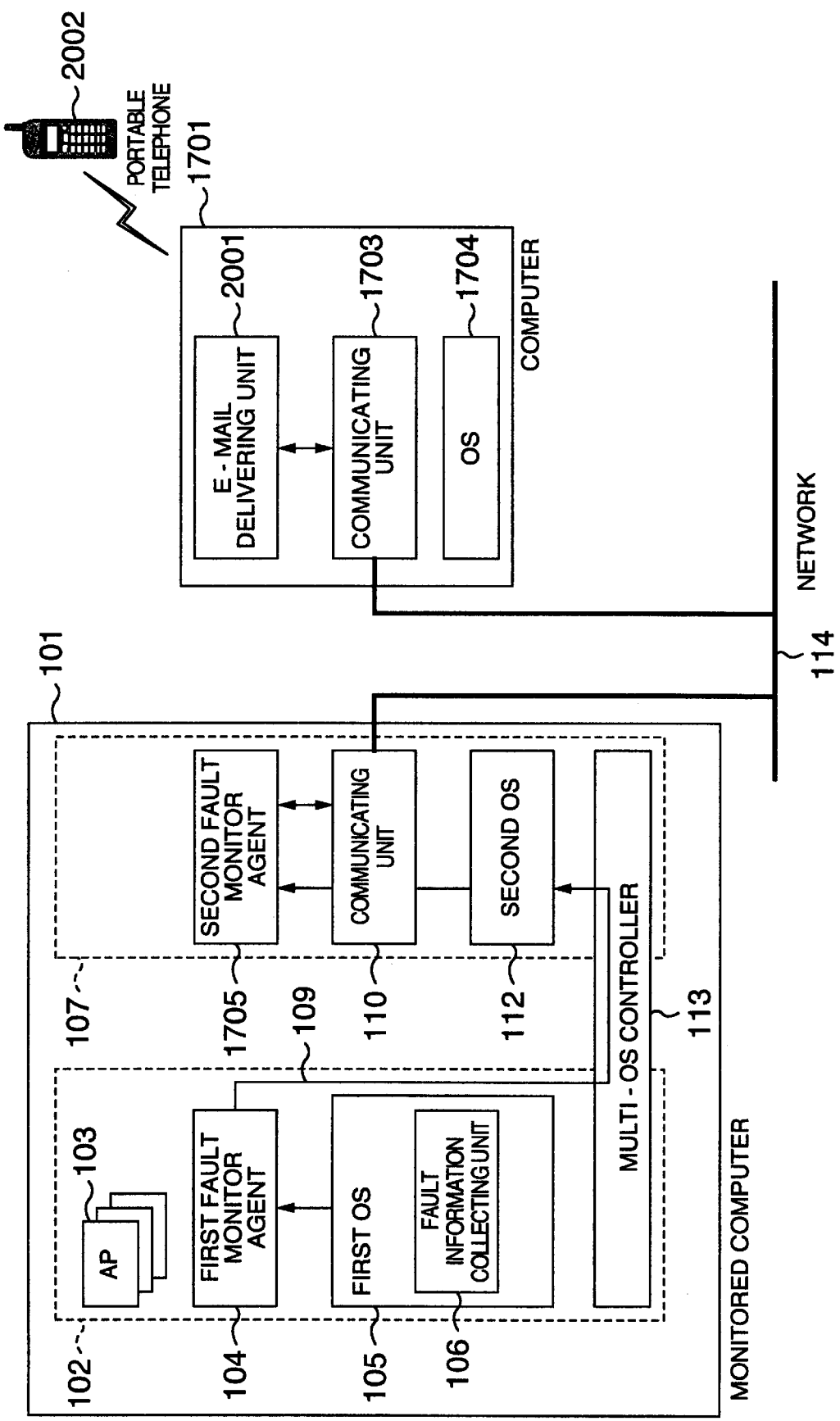
FIG. 20 is a block diagram showing the construction of a modified fault monitoring system using a mobile telephone capable of performing transmission/reception of E-mail in the second embodiment.

In FIG. 20, a monitored computer 101 and a computer serving as a mail server have the same function as that in the computer system in FIG. 17. In the computer system shown in FIG. 20, no monitoring computer is connected to a network 114. When detecting a fault, a second fault monitor agent 1705 transmits E-mail for which a mail address of the portable telephone 2002 is designated as an address of notification destination.

When the E-mail for which the mail address used by the portable telephone 2002 is designated arrives, the E-mail delivering means 2001 of computer 1701 transfers the E-mail to the portable telephone 2002.

A concrete process for monitoring the monitored computer 101 in the system shown in FIG. 20 is similar to that in the aforementioned system shown in FIG. 17 and will not be described.

By transmitting/receiving E-mail between the second fault monitor agent 1705 of monitored computer 101 and the portable telephone 2002, fault notification to the portable telephone 2002 by the monitored computer 101, restarting of the monitored computer 101 by the portable telephone 2002 and collection of fault information can be permitted.

In the first and second embodiments described in the foregoing, fault detection is effected by transmitting/receiving the alive message 109 between the first fault monitor agent 104 operating in the first OS software environment and the second fault monitor agent 108 operating in the second OS software environment. In the following, fault monitoring using an optional board (fault monitoring board) connected to an I/O bus of a monitored computer will be described.

Figure 13:
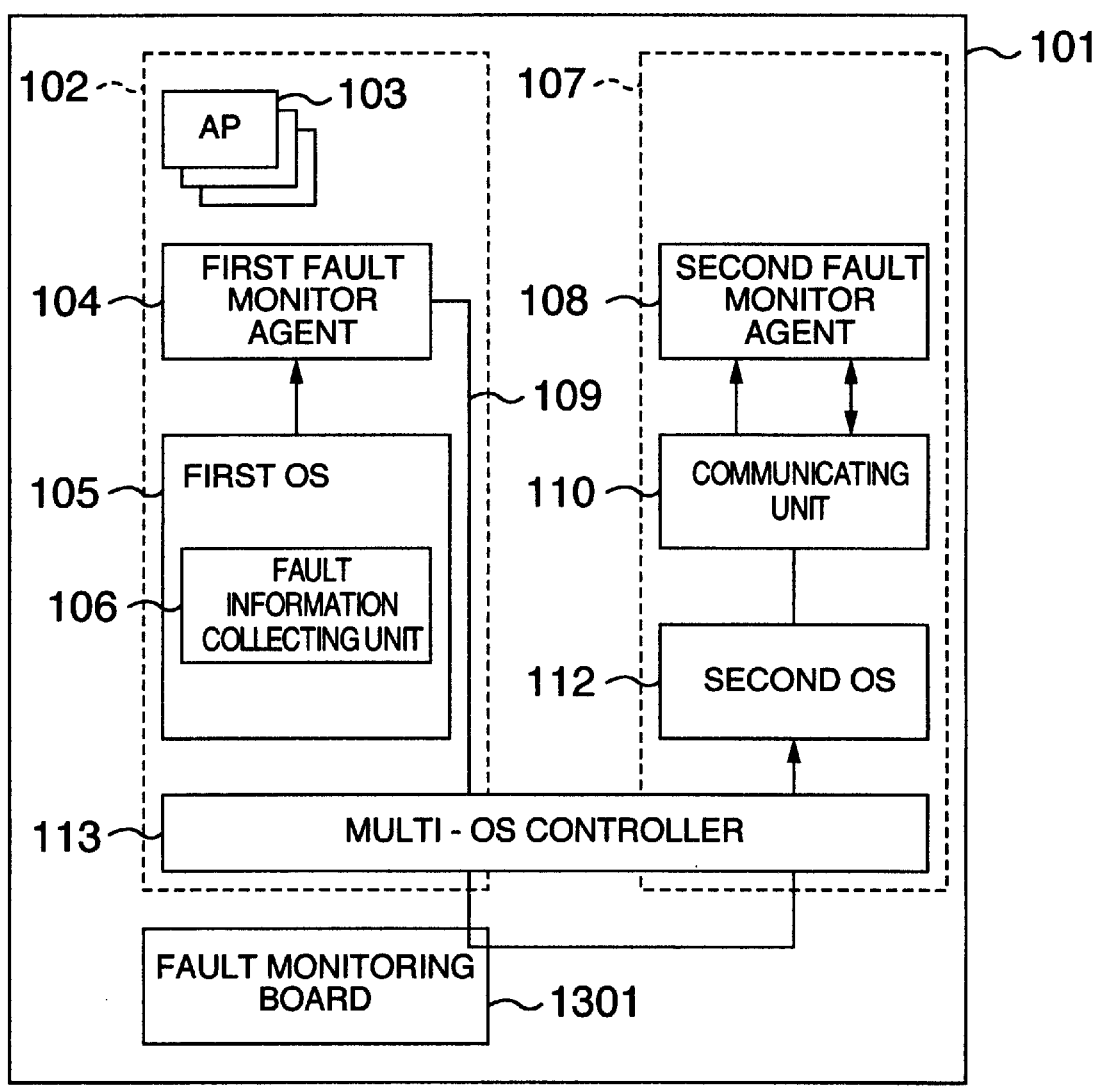
FIG. 13 is a block diagram showing the construction of a monitored computer according to a third embodiment of the invention.

Referring to FIG. 13, a monitored computer according to a third embodiment of the invention is constructed as shown in block form.

As shown, from the standpoint of software, a monitored computer 101 in the present embodiment is constructed similarly to the monitored computer in the first or second embodiment set forth so far. As hardware, the monitored computer 101 has a fault monitoring board 1301 connected to the I/O bus. The fault monitoring board 1301 is allotted as a hardware resource utilized by a first OS 105 by means of computer resource dividing means of a multi-OS controller 113.

As will be described later, the fault monitoring board 1301 is provided with an alive message receiving register for holding an alive message 109. First OS alive message transmitting means of first fault monitor agent 104 notifies the fault monitoring board 1301 that the first OS 105 operates normally by periodically writing a value "1" in the alive message receiving register. The fault monitoring board 1301 detects occurrence of a fault in the first OS by checking the value of the alive message receiving register. When the fault monitoring board 1301 determines that a fault takes place in the first OS software environment, it transmits an interruption signal to a CPU of the computer 101.

The multi-OS controller 113 is provided with a monitoring board interruption generating flag which is set to "1" when the fault monitoring board 1301 makes an interruption. Fault detecting means of second fault monitor agent 108 periodically checks the monitoring board interruption generating flag to decide whether a fault is generated in the first OS software environment.

Figure 14:
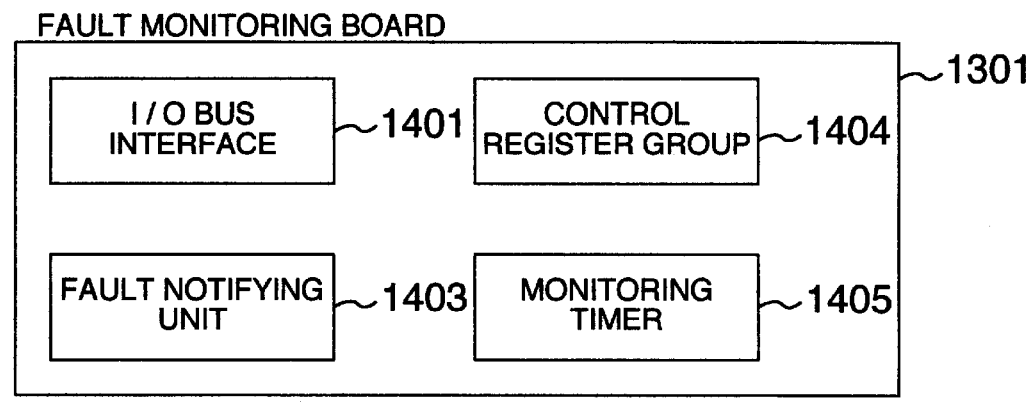
FIG. 14 is a block diagram showing the construction of a fault monitoring board.

The construction of the fault monitoring board 1301 is illustrated in block form in FIG. 14.

The fault monitoring board 1301 has an I/O bus interface 1401, fault notifying means 1403, a control register group 1404 and a monitoring timer 1405.

When started to operate, the monitoring timer 1405 counts down its timer value every second until the timer value becomes "0". At the time that the timer value of the monitoring timer 1405 becomes "0", the fault notifying means 1403 causes the CPU of the computer connected with the fault monitoring board 1301 to perform an interruption. The control register group 1404 is adapted to execute control of the fault monitoring board 1301.

Figure 15:
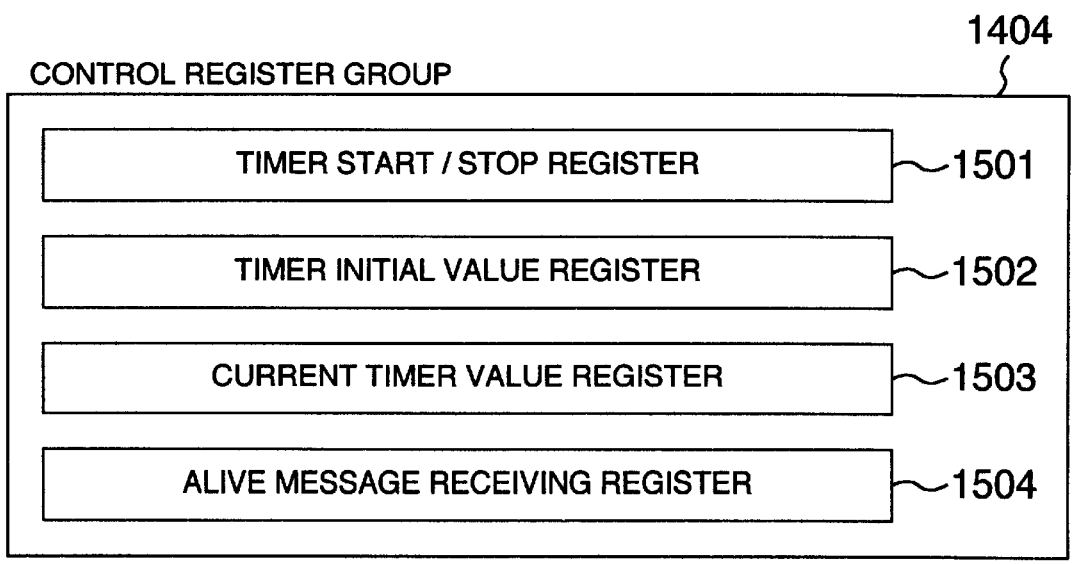
FIG. 15 is a diagram for explaining the construction of registers included in a control register group.

Referring to FIG. 15, the construction of registers included in the control register group 1404 will be described.

There exist in the control register group registers 1501 to 1504 serving as control registers. Values of the register group 1404 can be read/written by the CPU of the monitored computer 101 through the I/O bus interface.

The register 1501 is a timer start/stop register for controlling start and stop of the monitoring timer 1405. When a value "1" is written to the timer start/stop register 1501, the monitoring timer 1405 starts and when a value "0" is written, the monitoring timer 1405 stops. By setting the value "1" to the timer start/stop register 1501, fault monitoring can be executed.

The register 1502 is a monitoring timer initial value register for holding the initial value of the monitoring timer 1405. During initialization of the monitoring timer 1405, the value set in the monitoring timer initial value register 1502 is set as the initial value of the monitoring timer 1405.

The register 1503 is a current timer value register for holding the current value of the monitoring timer. The program operating on the monitored computer 101 can know the current value of the monitoring timer 1405 by reading the value of the current timer value register 1503.

The register 1504 is a register written with an alive message of the first OS (alive message receiving register). When a value "1" is written to the alive message receiving register 1504, the timer value of the monitoring timer 1405 is initialized.

Figure 16:
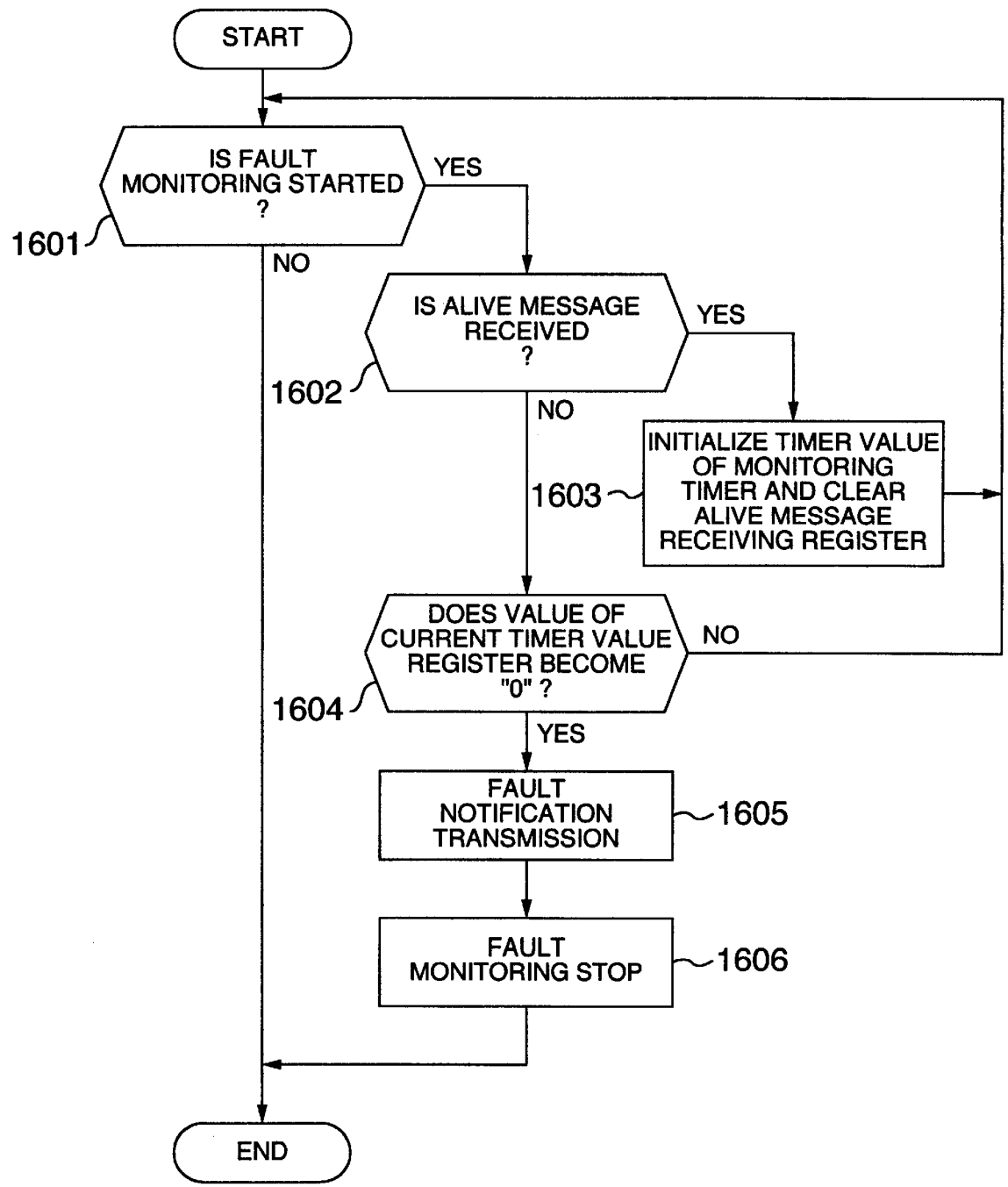
FIG. 16 is a flow chart showing operation during fault monitoring by the fault monitoring board.

Referring to FIG. 16, there is illustrated a flow chart showing operation during fault monitoring by the fault monitoring board 1301.

In step 1601, it is checked whether the monitoring timer 1405 is started. To carry out this checking operation, the timer start/stop register 1501 is referred. If the monitoring timer 1405 is in stop, the fault monitoring by the fault monitoring board 1301 does not function.

In case the monitoring timer 1405 is started and the fault monitoring fulfils itself, it is checked in the succeeding step 1602 whether an alive message is received. If the first OS 105 operates normally, the first fault monitor agent 104 is executed periodically and "1" is written in the alive message receiving register 1504. Accordingly, the value of the alive message receiving register 1504 being "1" indicates that the alive message is being transmitted but the value being "0" indicates that the alive message is not being transmitted. Checking of the alive message can be implemented by referring to value of the alive message receiving register 1504. With the value of the register 1504 being "1", the program proceeds to step 1603 but with the value being "0", the program proceeds to step 1604.

In the step 1603, the value held in the monitoring timer initial value register 1502 is set as a timer value of the monitoring timer 1405, so that the timer value of the monitoring timer 1405 is initialized. Also, the value of the alive message receiving register 1504 is cleared (value "0" is set). Thereafter, the program returns to the step 1601 in which monitoring of the first OS 105 continues.

In the step 1604, it is decided whether the timer value of the monitoring timer 1405 becomes "0". With the timer value of the monitoring timer 1405 rendered "0", it is indicated that the alive message is not transmitted before a predetermined time elapses. Accordingly, when the timer value becomes "0", it is determined that a fault occurs in the software environment of the first OS 105. If the timer value is not rendered "0", the program returns to the step 1601 in which the fault monitoring continues.

In step 1605, the fault monitoring board 1301 transmits an interruption signal to the CPU of the monitored computer 101 through the fault notifying means 1403. This process is executed when the occurrence of a fault in the software environment of the first OS 105 is determined in the step 1604.

When a fault notification is issued in the step 1605, the fault monitoring board 1301 stops fault monitoring in step 1606.

When an interruption occurs in the step 1605, this interruption is processed by the multi-OS controller 113 and as described previously, the monitoring board interruption generating flag is set to "1". The second fault monitor agent 108 periodically inspects the state of the monitoring board interruption generating flag to detect a fault generated in the software environment of the first OS 105. The process following the detection of a fault in the first OS 105 by the second fault monitor agent 108 is carried similarly to that in the first or second embodiment described previously. Accordingly, its concrete contents will not be described herein.

With the present embodiment, a fault monitoring system similar to that in the first embodiment can be realized. If in the present embodiment a non-maskable interruption signal that cannot be masked by the computer mechanism is used as the interruption signal transmitted from the fault monitoring board 1301 for the purpose of notifying the fault, the interruption signal from the fault monitoring board 1301 can reach the CPU even when a fault occurs under the condition that the first OS masks all maskable interruption signals of the monitored computer, so that the program operating in the software environment of the second OS can be operated.

According to the embodiments set forth so far, the multi-OS environment is utilized so that the software environment for monitoring and the monitored software environment may operate on the same computer. Therefore, even when a software fault occurs in the monitored software environment, fault information such as memory information and register information in the monitored software environment can be collected from the monitoring software environment and restarting of the computer can be controlled thereby.

Also, the monitoring software environment can communicate with the monitored computer through the network, so that the monitoring computer connected to the network can command the fault monitor agent of the monitored computer to operate the monitored computer.

Further, since the software environment for monitoring is constructed by utilizing part of resources of the computer in which the monitored software environment is constructed, the amount of computer resources used in the monitoring software environment can be changed easily. As a result, limitation imposed on the function owing to a shortage of computer resources can be relieved.

According to the invention, when a fault occurs in a computer, the occurrence of the fault is notified to a different computer connected through the network and the computer can be controlled by a request command from the different computer connected through the network.

What is claimed is:

1. A fault monitoring system comprising a computer having multi-OS controlling means for operating a first operating system (OS) and a second OS different from said first OS and performing communication between said first and second OS's, said computer being formed with a first software environment constructed by said first OS and a second software environment constructed by said second OS, and a monitoring computer connected to said computer through a network to monitor software faults on said computer, said second software environment including:

communicating means for performing communication with said monitoring computer;

fault detecting means for deciding the generation of a fault in said first OS;

fault communicating means for transmitting a fault notification to said monitoring computer through said communicating means when said fault detecting means detects a fault in said first OS; and computer controlling means for controlling said computer in accordance with a command from said monitoring computer.

2. A fault monitoring system according to claim 1, wherein said computer controlling means includes restarting means for restarting said computer.

3. A fault monitoring system according to claim 1, wherein said first OS includes fault information collecting means for collecting fault information when a fault occurs, and said computer controlling means includes fault information collection starting means for starting said fault information collecting means.

4. A fault monitoring system according to claim 1, wherein said multi-OS controlling means includes memory information collecting means for collecting memory information in said first software environment, collects memory information in said first OS in accordance with a command from said monitoring computer and transmits the collected memory information to said monitoring computer.

5. A fault monitoring system according to claim 1, wherein said multi-OS controlling means includes register information collecting means for collecting register information during execution of said first OS, collects register information in said first OS in accordance with a command from said monitoring computer and transmits said register information to said monitoring computer.

6. A fault monitoring system according to claim 1, wherein E-mail is used for communication between said computer and said monitoring computer.

7. A fault monitoring system according to claim 6, wherein said monitoring computer is a mobile terminal capable of transmitting/receiving the E-mail.

8. A fault monitoring system according to claim 1, wherein said computer includes a monitoring circuit for monitoring an alive message delivered out of a program operating on said first software environment, detecting a software fault on said first software environment in accordance with the presence or absence of said alive message and notifying a processor of the occurrence of the fault, and said fault detecting means decides said fault on the basis of the notification from said monitoring circuit.

9. A fault monitoring method executed in a second software environment of a fault monitoring system comprising a computer having multi-OS controlling means for operating a first operating system (OS) and a second OS different from said first OS and performing communication between said first and second OS's, said computer being formed with a first software environment constructed by said first OS and said second software environment constructed by said second OS, and a monitoring computer connected to said computer through a network to monitor software faults on said computer, comprising the steps of:

deciding the presence or absence of faults occurring in said first OS on the basis of an alive message from said first software environment;

transmitting a fault notification to said monitoring computer through means for communication with said monitoring computer when a fault in said first OS is detected; and controlling said computer in accordance with a command from said monitoring computer.

10. A fault monitoring system comprising a computer and a monitoring computer connected to said computer through a network to monitor software faults on said computer, said computer including:

multi-OS controlling means for operating a first operating system (OS) and a second OS different from said first OS and performing communication between said first and second OS's;

a first software environment constructed by said first OS; and a second software environment constructed by said second OS, said second software environment including:
communicating means for performing communication with said monitoring computer;

fault detecting means for deciding generation of a fault in said first OS;

fault notifying means for transmitting a fault notification to said monitoring computer through said communicating means when said fault detecting means detects a fault in said first OS; and computer controlling means for controlling said computer in accordance with a command from said monitoring computer.

11. A computer in which a first operating system (OS) and a second OS different from said first OS operate, comprising:

multi-OS controlling means for operating said first and second OS's and performing communication between said first and second OS's;

fault detecting means for deciding, under control of said second OS, the generation of a fault in said first OS through said multi-OS controlling means; and fault notifying means for transmitting a fault notification to an outside when said fault detecting means detects a fault in said first OS.

12. A computer according to claim 11 further comprising computer controlling means for controlling said computer in accordance with a command sent from an outside.

* * * * *